May 8, 1956   L. F. FIEDOR   2,744,749
VEHICLE SUSPENSION MECHANISM
Filed June 11, 1952
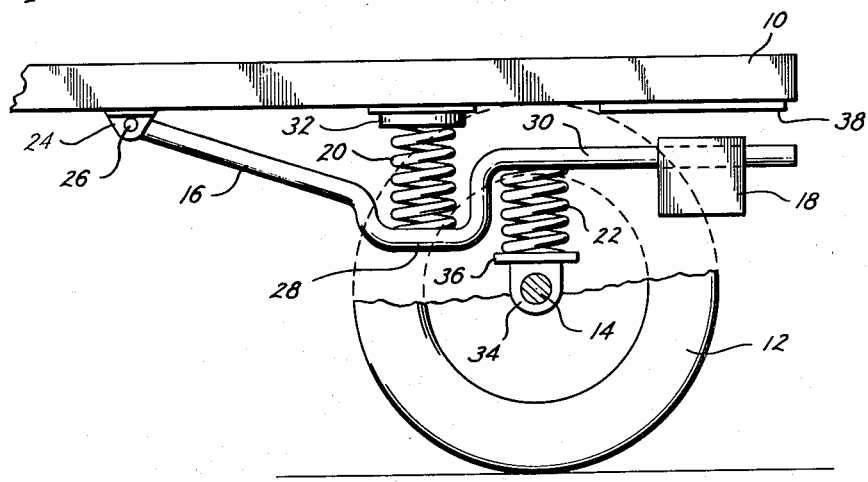
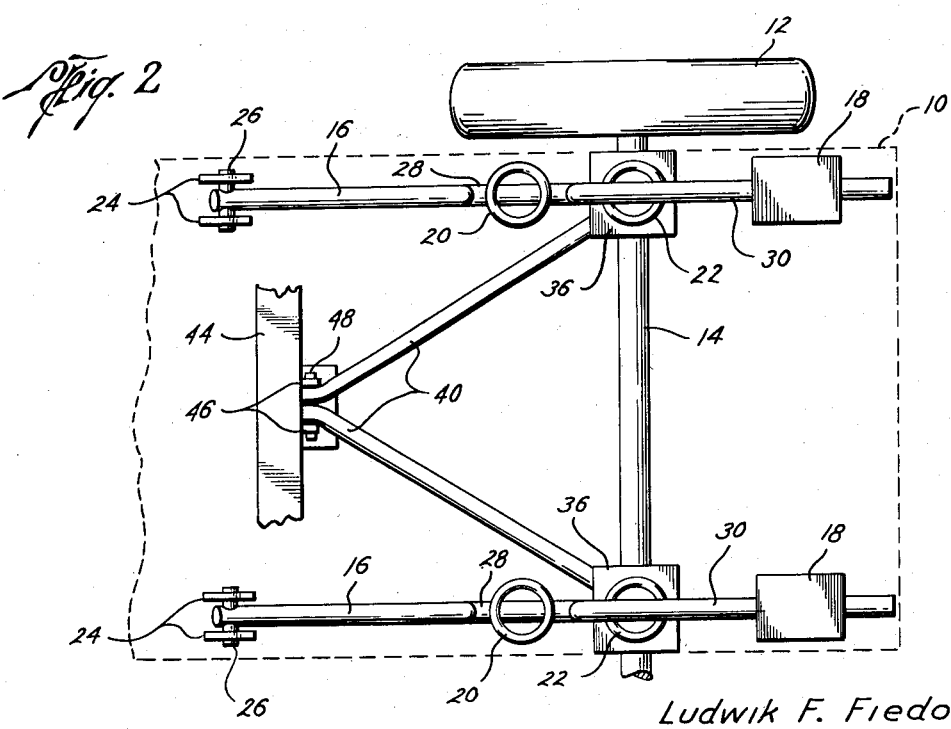
Ludwik F. Fiedor
INVENTOR.
BY Charles E. Lightfoot
ATTORNEY

United States Patent Office 2,744,749
Patented May 8, 1956

2,744,749

VEHICLE SUSPENSION MECHANISM

Ludwik F. Fiedor, Houston, Tex.

Application June 11, 1952, Serial No. 292,870

5 Claims. (Cl. 267—20)

This invention relates to vehicle suspension mechanism and more particularly to suspension mechanism whereby the shock resulting from movement of a vehicle over irregular or bumpy surfaces is effectively absorbed and prevented from being transmitted to the vehicle.

The invention finds particular application to automobiles and similar vehicles, in which the body of the vehicle is customarily supported on the wheels through the intermediation of spring mechanism intended to absorb the shock produced by the engagement of the wheels with bumps or other irregularities in the road.

In suspension mechanism of this type, as heretofore employed, it has been customary to provide various combinations and arrangements of springs, which are interposed between the wheels and the body of the vehicle, and by which the shock of the impact of the wheels upon irregularities in the road is cushioned and absorbed. Such spring mechanism however, is subject to the disadvantage that due to the natural periodicity of the springs, there is a tendency to produce a rebounding action in the mechanism at certain frequencies, which has been found difficult to overcome. Attempts have been made to eliminate this disadvantage by the provision of various combinations of springs having different characteristics, but no completely satisfactory solution has been found. Another disadvantage possessed by suspension mechanism of the kind referred to, as heretofore customarily employed, is that the provision of spring means having sufficient rigidity to properly support the load of the vehicle often results in the production of hard riding characteristics, while on the other hand the use of spring means which is sufficiently flexible to give desirable shock absorbing characteristics to the mechanism, is frequently inadequate to support the load of the vehicle.

The present invention has for its chief object the provision of vehicle suspension mechanism, whereby the above disadvantages may be overcome, and which has improved shock-absorbing and load supporting characteristics.

Another object of the invention is to provide vehicle suspension means in which a combination of weights and springs is employed to secure improved easy riding qualities in the mechanism.

A further object of the invention is to provide vehicle suspension mechanism including a lever which is pivotally connected to the body of the vehicle, weight means carried by the lever, and spring means interposed between the lever and body and between the lever and the wheels, whereby the vehicle is suitably supported on the wheels.

Another object of the invention is the provision of vehicle suspension mechanism which is compact in construction, and which is designed to require a minimum of movement of the parts to secure the required shock-absorbing action.

A still further object of the invention is the provision of vehicle suspension mechanism which is of simple design and rugged construction, capable of long withstanding the hard usage and extreme conditions of wear and exposure to which such apparatus is customarily subjected.

The above and other important objects and advantages of the invention will best be understood from the following detailed description, constituting a specification of the same, when considered in conjunction with the annexed drawings, wherein—

Figure 1 is a fragmentary, side elevational view of a portion of a vehicle, showing a preferred form of the invention applied thereto; and Figure 2 is a top plan view of the vehicle as seen in Figure 1.

Referring now to the drawings in greater detail, the invention is illustrated in its application to a vehicle of conventional construction having a body or frame, indicated at 10, which is supported on an axle 14, to which the usual wheels, such as that indicated at 12, are journalled.

The spring suspension mechanism of the invention is interposed between the axle 14 and the body or frame 10 of the vehicle, and in its preferred form comprises one or more levers 16, pivotally connected to the vehicle, for vertical swinging movement relative thereto, a weight 18, of suitable character carried on the lever, and resilient means, such as the coiled springs 20 and 22, interposed respectively between the vehicle and the lever, and between the lever and axle.

In the present illustration the lever 16 is pivotally connected at one end, to a pair of depending perforated lugs 24, 24, attached beneath the vehicle, and a pivot pin 26 which passes through the lugs and through a suitable opening adjacent the end of the lever. For purposes of compactness of the mechanism, the lever 16 may have a downwardly offset portion 28, upon which the spring 20 is seated, and an upwardly offset portion 30, which is supported on the spring 22, the portion 28 extending beyond the spring 22 a sufficient distance to permit the attachment of the weight 18 thereto.

A spring plate, such as that indicated at 32, may be attached beneath the body of the vehicle, upon which the upper end of the spring 20 bears, and suitable means may be provided, such as the bearing 34, mounted on the axle 14, and having a spring plate 36 thereon, upon which the lower end of the spring 22 is seated. Buffer means 38, such as a rubber pad or the like, may be disposed beneath the vehicle in position for engagement by the weight 18, in the event that the movements of the body or the wheels is sufficient to cause them to cause the weight to engage the body.

As many such mechanisms as described above may be provided as necessary or expedient, two being shown in the present illustration, located at opposite sides of the vehicle, as will be plainly seen in Figure 2, and means may be provided for bracing such an arrangement against lateral movement with respect to the vehicle. As seen in Figure 2 the bracing means may take the form of tie rods 40, 40, each suitably attached at one end to the axle 14, the other ends of the tie rods converging and being pivotally connected to a cross-member 44, or other part of the vehicle, by means of spaced perforated lugs 46, and a pin 48, which extends through the lugs and through suitable openings in the ends of the rods.

It will be apparent that by the above described bracing arrangement the levers 16 are free to swing vertically relative to the body of the vehicle, but are restrained against lateral movement relative to each other.

The weights 18 may be of any suitable character, and may be adjustably supported on the levers 16 in any convenient manner, whereby the positions of the weights may be adjusted as desirable or expedient.

In the operation of the vehicle vertical movement of the wheels 12 results in the application of a compressive force to the springs 22, a portion of which may be transmitted to the levers 16 to move the levers upwardly toward the body of the vehicle. Such upward movement of the levers is further cushioned by the compression of the springs 20, and due to the force required to cause the weights 18 to move relative to the body of the vehicle the movement of the levers 16 may be reduced to a minimum in overcoming and absorbing the shock due to operation of the vehicle over irregular surfaces. Moreover, the weights 18 tend to reduce the rapidity with which the springs 20 and 22 are extended or rebound, upon the movement of the axle 14 and the body away from each other, so that very little movement of the levers 16 is necessary to provide effective shock absorbing action, which results in improved easy riding qualities in the operation of the vehicle.

It will readily be appreciated that the positions of the springs 20 and 22 may be varied with reference to the pivotal connections of the levers 16 with the body of the vehicle, to adapt the mechanism for application to various types of vehicles, as well as the particular conditions under which the mechanism must operate, and that because of the ready adjustability of the position and value of the weights 18, adjustment may be made to suit the mechanism to variation in the operating conditions.

It will thus be seen that the invention as described above provides vehicle suspension mechanism of simple design, which is easily adapted for use with a wide variety of different types of vehicles, and by which improved riding qualities may be obtained.

While the invention has been disclosed in connection with a particular embodiment of the same, it will be understood that this is intended by way of illustration only, and that numerous changes can be made in the construction and arrangement of the various parts, without departing from the spirit of the invention, or the scope of the appended claims.

Having thus clearly shown and described the invention, what is claimed as new and desired to secure by Letters Patent is:

1. In a vehicle having a body and an axle, suspension mechanism comprising a lever, pivotal means connecting one end of the lever to the body at a point longitudinally inwardly of the axle for vertical swinging movement, a weight carried by said lever, and yieldable means located vertically above the lever and extending generally vertically between the lever and body in position to coact with the body and lever to resist relative movement of the body and lever toward each other and vertically below the lever and extending generally vertically between the axle and lever in position to coact with the axle and lever to resist relative movement of the axle and lever toward each other.

2. In a vehicle having a body and an axle, suspension mechanism comprising a lever, pivotal means connecting one end of the lever to the body at a point longitudinally inwardly of the axle for vertical swinging movement, a weight carried by the lever, and yieldable means located vertically below the lever mediate the weight and said pivotal means and extending generally vertically between the axle and lever in position to coact with the axle and lever to resist relative movement of the axle and lever toward each other and vertically above the lever and extending generally vertically between the lever and body in position to coact with the body and lever to resist relative movement of the body and lever toward each other.

3. In a vehicle having a body and an axle, suspension mechanism comprising a lever, pivotal means connecting one end of the lever to the body at a point longitudinally inwardly of the axle for vertical swinging movement, a weight carried by the lever, a first yieldable means located vertically above the lever and extending generally vertically between the body and lever mediate said weight and said pivotal means in position to resist relative movement of the body and lever toward each other, and a second yieldable means located vertically below the lever and extending generally vertically between said axle and lever mediate said weight and said first yieldable means, in position to coact with the lever and axle to resist relative movement of the lever and axle toward each other.

4. In a vehicle having a body and an axle, suspension mechanism comprising a plurality of levers, pivotal means connecting an end of each lever to the body longitudinally inwardly of the axle for vertical swinging movement, a weight carried by each lever, yieldable means located vertically above each lever and extending generally vertically between the lever and the body mediate the weights and said pivotal means in position to coact with the lever and body to resist relative movement of the lever and body toward each other, and yieldable means located below each lever and extending generally vertically between the lever and axle in position to support the lever on the axle.

5. In a vehicle having a body and an axle, suspension mechanism comprising a plurality of levers, pivotal means connecting an end of each lever to the body at a point longitudinally inwardly of the axle for vertical swinging movement, weight means carried by the levers, first yieldable means located vertically above each lever and extending generally vertically between the levers and the body mediate the weight means and said pivotal means in position to coact with the body and levers to resist relative movement of the body and levers toward each other, and second yieldable means located vertically below each lever and extending generally vertically between the levers and axle mediate said weight means and said first yieldable means to support the levers on the axle.

References Cited in the file of this patent

UNITED STATES PATENTS

| | | |
|---|---|---|
| Re. 16,480 | Clauson | Nov. 16, 1926 |
| 1,209,322 | Neal | Dec. 19, 1916 |
| 1,333,999 | Smith | Mar. 16, 1920 |
| 1,427,081 | Williams | Aug. 22, 1922 |
| 1,556,211 | Fay | Oct. 6, 1925 |
| 2,199,084 | Schieferstein | Apr. 30, 1940 |